US011483491B2

(12) United States Patent
Han

(10) Patent No.: US 11,483,491 B2
(45) Date of Patent: Oct. 25, 2022

(54) IMAGE ACQUISITION METHOD, APPARATUS, AND STORAGE MEDIUM THAT ADJUSTS THE LIGHT TRANSMITTANCE OF AN AREA HAVING A UNDER-SCREEN CAMERA DISPOSED BELOW THE AREA

(71) Applicant: GUANGDONG OPPO MOBILE TELECOMMUNICATIONS CORP., LTD., Guangdong (CN)

(72) Inventor: Bingquan Han, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 127 days.

(21) Appl. No.: 16/923,769

(22) Filed: Jul. 8, 2020

(65) Prior Publication Data

US 2021/0084236 A1 Mar. 18, 2021

(30) Foreign Application Priority Data

Sep. 17, 2019 (CN) ........................ 201910875370.2

(51) Int. Cl.
*H04N 5/247* (2006.01)
*H04N 5/225* (2006.01)
(Continued)

(52) U.S. Cl.
CPC ........... *H04N 5/247* (2013.01); *G06V 10/141* (2022.01); *G06V 40/1318* (2022.01);
(Continued)

(58) Field of Classification Search
CPC .... H04N 5/247; H04N 5/2256; H04N 5/2257; H04N 5/23293; H04N 5/2628;
(Continued)

(56) References Cited

U.S. PATENT DOCUMENTS

2012/0102332 A1 4/2012 Mullin
2015/0062005 A1 3/2015 Rajendran et al.
(Continued)

FOREIGN PATENT DOCUMENTS

CN 102572095 A 7/2012
CN 103092344 A 5/2013
(Continued)

OTHER PUBLICATIONS

OA and English translation of OA for CN application 201910875370.2 mailed Jul. 28, 2020.

(Continued)

*Primary Examiner* — Nicholas G Giles
(74) *Attorney, Agent, or Firm* — Young Basile Hanlon & MacFarlane, P.C.

(57) ABSTRACT

The present disclosure provides an image acquisition method, an image acquisition apparatus, and a storage medium. The method is applicable for a terminal, and a display screen of the terminal includes a first screen area and a second screen area, and an under-screen camera is disposed under the second screen area. The method includes: when receiving an image acquisition instruction, adjusting a light transmittance of the second screen area, in which the adjusted light transmittance of the second screen area is greater than the light transmittance of the second screen area before adjustment; activating the under-screen camera in response to the image acquisition instruction, and performing image acquisition with the under-screen camera; and performing corresponding process on the image acquired by the under-screen camera, in which the corresponding process includes at least one of fingerprint image recognition and viewfinder image display.

18 Claims, 6 Drawing Sheets

(51) Int. Cl.

| | |
|---|---|
| ***H04N 5/232*** | (2006.01) |
| ***H04N 5/262*** | (2006.01) |
| ***G06V 10/141*** | (2022.01) |
| ***G06V 40/60*** | (2022.01) |
| ***G06V 40/13*** | (2022.01) |

(52) U.S. Cl.
CPC ........... *G06V 40/67* (2022.01); *H04N 5/2256* (2013.01); *H04N 5/2257* (2013.01); *H04N 5/23293* (2013.01); *H04N 5/2628* (2013.01)

(58) Field of Classification Search
CPC .. G06V 10/141; G06V 40/1318; G06V 40/67; G02F 1/13338; G02F 1/136281
See application file for complete search history.

(56) References Cited

U.S. PATENT DOCUMENTS

| | | | | |
|---|---|---|---|---|
| 2017/0249494 | A1* | 8/2017 | Zhang | G02F 1/13338 |
| 2017/0270342 | A1 | 9/2017 | He et al. | |

FOREIGN PATENT DOCUMENTS

| | | | |
|---|---|---|---|
| CN | 105260093 | A | 1/2016 |
| CN | 205318406 | U | 6/2016 |
| CN | 108171178 | A | 6/2018 |
| CN | 108196714 | A | 6/2018 |
| CN | 108983872 | A | 12/2018 |
| CN | 109034103 | A | 12/2018 |
| CN | 109196522 | A | 1/2019 |
| CN | 109416558 | A | 3/2019 |
| CN | 109618029 | A | 4/2019 |
| CN | 109801903 | A | 5/2019 |
| CN | 110581910 | A | 12/2019 |

OTHER PUBLICATIONS

Indian Examination Report for IN Application 202014036941 dated Nov. 23, 2021. (7 pages).
Chinese Refutation decision with English Translation for CN Application 201910875370.2 dated Jul. 13, 2021. (14 pages).
Second Office Action with English Translation for CN Application 201910875370.2 dated Feb. 24, 2021. (20 pages).
OA for EP application 20194534.2 mailed Feb. 3, 2021.
ISR for PCT application PCTCN2020112695 mailed Dec. 1, 2020.
Under-display cameras are coming, but prepare for potato quality photos for a few years; Manuel Vonau; 6 pages.
Chinese Office Action with English Translation for CN Application 201910875370.2 dated Mar. 9, 2022. (19 pages).
Chinese Review decision OA with English Translation for CN application 201910875370.2 dated Jun. 14, 2022.

* cited by examiner

IMAGE ACQUISITION METHOD, APPARATUS, AND STORAGE MEDIUM THAT ADJUSTS THE LIGHT TRANSMITTANCE OF AN AREA HAVING A UNDER-SCREEN CAMERA DISPOSED BELOW THE AREA

CROSS-REFERENCE TO RELATED APPLICATION(S)

The present application claims priority to Chinese Patent Application No. 201910875370.2, filed on Sep. 17, 2019, the entirety contents of which are incorporated herein by reference.

TECHNICAL FIELD

The present disclosure relates to a field of computer interaction technologies, and more particularly, to an image acquisition method, an image acquisition apparatus, and a storage medium.

BACKGROUND

Fingerprint identification is a common identity verification method adopted by mobile terminals. Mobile terminals with fingerprint identification function collect users' fingerprints through a fingerprint module, and then compare the collected fingerprint with a pre-registered fingerprint, and when the collected fingerprint matches with the pre-registered fingerprint, it is determined that the current user is authenticated.

In some instances, according to setting modes, the fingerprint modules may include a rear fingerprint module, a front fingerprint module and an under-screen fingerprint module. The rear fingerprint module is generally set on the back of the mobile terminal, the front fingerprint module is generally combined with physical buttons on the front of the mobile terminal, and the under-screen fingerprint module is provided below the screen of the mobile terminal.

SUMMARY

The embodiments of the present disclosure provide an image acquisition method, an image acquisition apparatus, and a storage medium.

Embodiments of the present disclosure provide an image acquisition method. The method is applicable for a terminal, and a display screen of the terminal includes a first screen area and a second screen area, and an under-screen camera is disposed under the second screen area. The method includes: when receiving an image acquisition instruction, adjusting a light transmittance of the second screen area, in which the adjusted light transmittance of the second screen area is greater than the light transmittance of the second screen area before adjustment; activating the under-screen camera in response to the image acquisition instruction, and performing image acquisition with the under-screen camera; and performing corresponding process on the image acquired by the under-screen camera, in which the corresponding process includes at least one of fingerprint image recognition and framing image display.

Embodiments of the present disclosure provide an image acquisition apparatus. The apparatus is applicable for a terminal, and a display screen of the terminal includes a first screen area and a second screen area, and an under-screen camera is disposed under the second screen area. The apparatus includes: one or more processors; a memory storing instructions executable by the one or more processors; in which the one or more processors are configured to: when receiving an image acquisition instruction, adjust a light transmittance of the second screen area, in which the adjusted light transmittance of the second screen area is greater than the light transmittance of the second screen area before adjustment; activate the under-screen camera in response to the image acquisition instruction, and perform image acquisition with the under-screen camera; perform corresponding process on the image acquired by the under-screen camera, in which the corresponding process includes at least one of fingerprint image recognition and framing image display.

Embodiments of the present disclosure provide a computer-readable storage medium, in which the storage medium stores at least one instruction, and when the at least one instruction is executed by a processor, an image acquisition method is implemented. The method includes: when receiving an image acquisition instruction, adjusting a light transmittance of the second screen area, in which the adjusted light transmittance of the second screen area is greater than the light transmittance of the second screen area before adjustment; activating the under-screen camera in response to the image acquisition instruction, and performing image acquisition with the under-screen camera; and performing corresponding process on the image acquired by the under-screen camera, in which the corresponding process includes at least one of fingerprint image recognition and framing image display.

DETAILED DESCRIPTION

To make the objectives, technical solutions, and advantages of the present disclosure clear, the following describes the embodiments of the present disclosure in further detail with reference to the accompanying drawings.

The term "a plurality of" herein refers to two or more, "and/or" describes a relation of the related objects and indicates three relations, for example, "A and/or B" indicates three conditions, i.e., A exists alone, A and B exist simultaneously, and B exists alone. The character "/" generally indicates that it is either the former related object or the latter related object.

Figure 1:
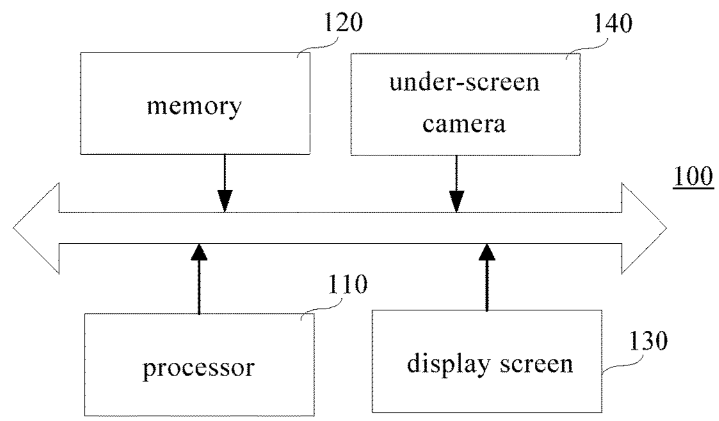
FIG. 1 is a block diagram of a terminal according to an example embodiment of the present disclosure.

FIG. 1 is a block diagram of a terminal 100 according to an example embodiment of the present disclosure. The terminal 100 may be a smart phone, a tablet computer, a notebook computer, or the like. The terminal 100 may include one or more of the following components: a processor 110, a memory 120, a display screen 130, and an under-screen camera 140.

The processor 110 may include one or more processing cores. The processor 110 uses various interfaces and lines to connect various parts of the entire terminal 100. By running or executing instructions, programs, code sets or instruction sets stored in the memory 120, and calling data stored in the memory 120, various functions of the terminal 100 is realized and data processing is executed. Optionally, the processor 110 is implemented in at least one hardware form of a digital signal processing (DSP), a field-programmable gate array (FPGA), and a programmable logic array (PLA). The processor 110 may be a combination of one or more of a central processing unit (CPU), a graphics processing unit (GPU), a neural-network processing unit (NPU), and a modem. CPU mainly processes the operating system, user interface and application programs. GPU is responsible for rendering and drawing the content that needs to be displayed on the touch screen 130. NPU is configured to implement the artificial intelligence (AI) functions. The modem is configured to process wireless communications. It is understood that the above-mentioned modem may not be integrated into the processor 110, and may be implemented by a chip alone.

The memory 120 may include a random access memory (RAM) or a read-only memory. Optionally, the memory 120 includes a non-transitory computer-readable storage medium. The memory 120 is configured to store instructions, programs, codes, code sets, or instruction sets. The memory 120 may include a storage program area and a storage data area, in which the storage program area may store instructions for implementing an operating system, instructions for implementing at least one function (such as a touch function, a sound playback function, and an image playback function), and instructions for implementing the following various method embodiments. The storage data area may store data created according to the use of the terminal 100 (such as audio data, and phone book).

The display screen 130 is a display component for displaying a user interface, which may be a liquid crystal display (LCD), a light-emitting diode (LED) display, an organic light-emitting diode (OLED) display, which are not limited in the embodiments of the present disclosure.

The display screen 130 is generally provided on a front panel of the terminal 130. The display screen 130 may be designed as a full screen, a curved screen, a special-shaped screen, a double-sided screen, or a foldable screen. The display screen 130 may be designed as a combination of a full screen and a curved screen, and a combination of a special-shaped screen and a curved screen, which is not limited in this embodiment.

In a possible implementation, the display screen 130 also has a touch function. With the touch function, the user can use any suitable object such as a finger or a touch pen to perform touch operations on the display screen 130.

The under-screen camera 140 is a camera disposed below the display screen 130 and is used for image acquisition through the display screen 130.

In order to improve the image acquisition quality of the under-screen camera 140 under the premise of ensuring the normal display of the display screen 130, in a possible implementation, the display screen 130 includes a first screen area and a second screen area, in which the first screen area is configured to display images normally. In addition to displaying images normally, the second screen area may turn transparent by changing the light transmittance. Correspondingly, the under-screen camera 140 is disposed below the second screen area.

Optionally, the area of the first screen area is greater than the area of the second screen area, and the area of the second screen area is slightly greater than the size of the under-screen camera 140. Moreover, the second screen area may be circular, square, or in other irregular shape, which is not limited in the embodiments of the present disclosure.

Figure 2:
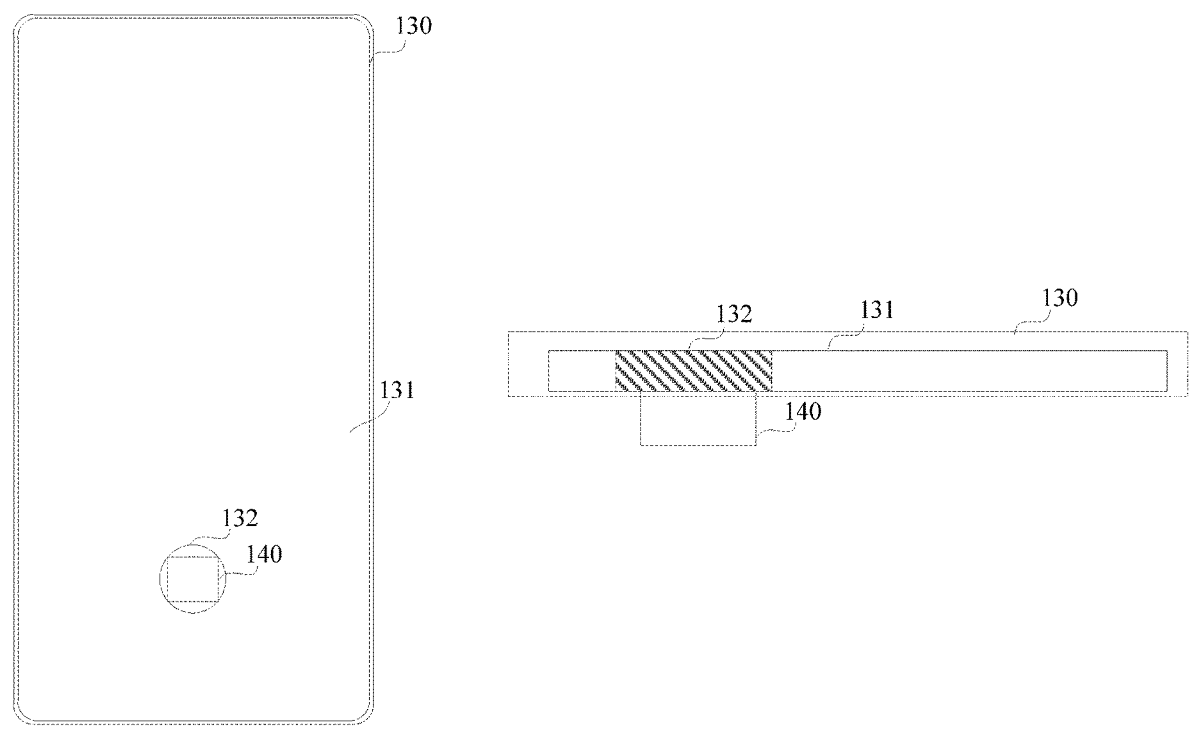
FIG. 2 is a schematic diagram of a relative position relation among a first screen area, a second screen area, and an under-screen camera according to an example embodiment of the present disclosure.

As illustrated in FIG. 2, the display screen 130 includes a first screen area 131 and a second screen area 132, and the under-screen camera 140 is disposed directly below the second screen area 132. In the normal display state, the first screen area 131 and the second screen area 132 are configured to display images. When image acquisition with the under-screen camera 140 is required, the terminal 100 increases the light transmittance of the second screen area 132, so that external light on the side of the screen 130 can pass through the second screen area 132 and be received by the under-screen camera 140.

Regarding the adjustment mode of the light transmittance of the second screen area, in a possible implementation, the second screen area is made of electrochromic material, and correspondingly, light transmittance of the second screen area is adjusted by adjusting a voltage of the second screen area.

Figure 3:
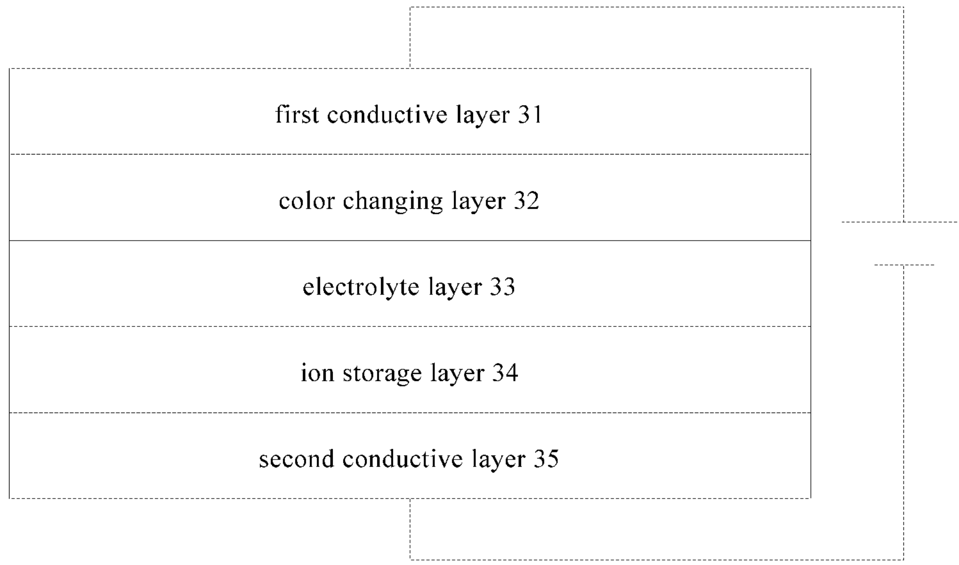
FIG. 3 is a schematic diagram of an electrochromic material according to an example embodiment of the present disclosure.

For example, FIG. 3 is a schematic diagram of an electrochromic material according to an example embodiment of the present disclosure. The electrochromic material includes a first conductive layer 31, a color changing layer 32, an electrolyte layer 33, an ion storage layer 34, and a second conductive layer 35.

The first conductive layer 31 and the second conductive layer 35 may be transparent conductive layers with excellent conductivity and good optical transparency, and the transparent conductive layer may be indium tin oxide (ITO), tin oxide (SnO2) and tin antimony oxide (ATO). The color changing layer 32 is a core layer of electrochromic material and a layer where color changing reaction occurs. The material of the color changing layer 32 includes tungsten trioxide (WO3) or nickel oxide (NiO) by types. Organic electrochromic materials mainly include polythiophenes and their derivatives, viologens, tetrathiafulvalene and metal phthalocyanine compounds. The electrolyte layer 33 is composed of special conductive materials, such as a liquid electrolyte material containing a solution of lithium perchlorate and sodium perchlorate, or it may also be a solid electrolyte material. The ion storage layer 34 is configured to store charges, that is, charges are stored correspondingly when a redox reaction occurs on the color changing layer 32, thereby ensuring a charge balance of the entire structure. When a voltage is applied between the first conductive layer 31 and the second conductive layer 35, the color-changing layer 32 undergoes an oxidation-reduction reaction under the voltage, thereby changing the color of the electrochromic material to achieve the effect of adjusting the light transmittance.

In addition to dynamically adjusting the light transmittance of the second screen area in the above manner, in other possible implementations, the second screen area itself may have a higher light transmittance by other means without adjusting the light transmittance. For example, pixel density of the second screen area is reduced to increase the area of the area where no display pixels are arranged, thereby increasing the light transmittance. Alternatively, the area of the area occupied by the driving circuit is reduced, for example, a number of thin film transistors (TFT) of active-matrix organic light emitting diode (AMOLED) is reduced, for example, passive-matrix organic light emitting diode (PMOLED) is adopted to increase the light transmittance, which is not limited in the embodiment of the present disclosure.

In addition, those skilled in the art may understand that the structure of the terminal 100 shown in the above drawings does not constitute a limitation on the terminal 100, and the terminal may include more or fewer components than the components in the figures, a combination of certain components, or different component arrangements. For example, the terminal 100 further includes components such as a microphone, a speaker, a radio frequency circuit, an input unit, a sensor, an audio circuit, a wireless fidelity (WiFi) module, a power supply, and a Bluetooth module, which is not be repeated herein.

Figure 4:
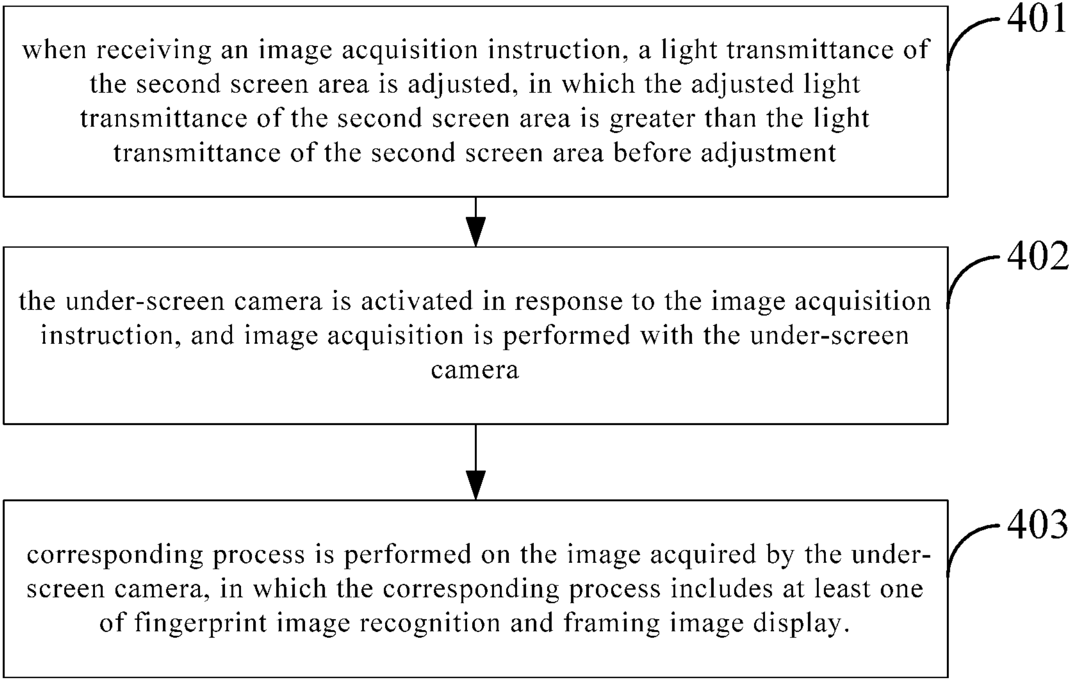
FIG. 4 is a flowchart of an image acquisition method according to an example embodiment of the present disclosure.

Referring to FIG. 4, a flowchart of an image acquisition method according to an example embodiment of the present disclosure is illustrated. This embodiment is demonstrated by applying the method to the terminal shown in FIG. 1 or 2. The method includes the following acts.

At block 401, when receiving an image acquisition instruction, a light transmittance of the second screen area is adjusted, in which the adjusted light transmittance of the second screen area is greater than the light transmittance of the second screen area before adjustment.

Optionally, the image acquisition instruction is an instruction that is triggered when there is a demand for using the under-screen camera. For example, when using fingerprint to unlock the screen, that is, when it is necessary to acquire fingerprint images with the under-screen camera, the terminal receives the triggered image acquisition instruction, and when it is necessary to take a selfie, that is, when it is necessary to acquire facial images with the under-screen camera, the terminal receives the triggered image acquisition instruction.

For adjusting the light transmittance of the second screen area, in a possible implementation, when the second screen area is made of electrochromic material, the terminal adjusts the second screen area by adjusting a voltage of the second screen area. For example, in the normal display state (that is, when no image acquisition instruction is received), a first voltage is applied to the second screen area, and the light transmittance of the second screen area is a first light transmittance. When the image acquisition instruction is received, the voltage applied to the second screen area is adjusted to a second voltage. At this time, the light transmittance of the second screen area is a second light transmittance, and the second light transmittance is greater than the first light transmittance. The first voltage and the second voltage are set in advance.

In an example, in the normal display state, the voltage applied to the second screen area is 0.5V and the light transmittance of the second screen area is 10%. When the image acquisition instruction is received, the voltage applied at the screen area is adjusted to 1.0V by the terminal, so that the light transmittance of the second screen area is increased to 90%.

Optionally, when receiving the image acquisition instruction, the terminal does not need to adjust the light transmittance of the first screen area, thereby ensuring normal image display of the first screen area.

At block 402, the under-screen camera is activated in response to the image acquisition instruction, and image acquisition is performed with the under-screen camera.

In a possible implementation, the under-screen camera is turned off (namely, is in a powerdown state) by default. When receiving the image acquisition instruction, the terminal activates the under-screen camera according to the image acquisition instruction, and image acquisition is performed with the under-screen camera (through the second screen area). Since the light transmittance of the second screen area is improved, the intensity of external light that can be received by the under-screen camera through the second screen area is stronger, thereby improving the imaging quality of the under-screen camera.

Optionally, during the image acquisition process of the under-screen camera, an auto-focusing operation is performed, or focusing is performed according to the received manual focusing operation, thereby improving the image acquisition quality.

It is noted that there is no strict sequence between the above acts at blocks 401 and 402, that is, after receiving the image acquisition instruction, the terminal can simultaneously turn on the under-screen camera and adjust the light transmittance of the second screen area. The execution of the act at block 401 before the act at block 402 is taken as an example for schematic description, which is not constructed as a limitation.

At block 403, corresponding process is performed on the image acquired by the under-screen camera, in which the corresponding process includes at least one of fingerprint image recognition and framing image display.

In the fingerprint recognition scenario, the under-screen camera is equivalent to an under-screen fingerprint module. The image collected by the under-screen camera is a fingerprint image. Correspondingly, the terminal recognizes the fingerprint image (e.g., matching the fingerprint image with a fingerprint image template), and after the fingerprint image is recognized, the corresponding operation (for example, unlocking the terminal, logging into an application program, and completing payment) is performed.

In the front shooting scene, the under-screen camera is equivalent to a front camera, and the image collected by the under-screen camera is a front view image. Correspondingly, the terminal displays the front view image on the viewing frame, where the viewing frame is displayed in the first screen area.

Compared with other solutions, according to which, in order to realize front shooting, a hole needs to be opened on the display screen and a front camera needs to be set separately. In order to realize fingerprint recognition, a fingerprint module needs to be set separately below the display screen. According to the embodiments of the present disclosure, by setting a display area with adjustable light transmittance on the display screen, and setting an under-screen camera below the display area, the terminal can reuse the under-screen camera for fingerprint image acquisition in different application scenarios or front-shooting image acquisition, so as to avoid setting a front camera and a fingerprint module separately in the terminal.

In conclusion, in the embodiments of the present disclosure, the under-screen camera is provided below the second screen area of the display screen, and when the image acquisition instruction is received, the light transmittance of the second screen area is increased to acquire images with the under-screen camera provided below the second screen area. In the corresponding application scenarios, fingerprint image identification is performed on the collected image or the collected image is displayed as a framing image. The under-screen camera is adopted to realize front shooting and fingerprint identification, thus avoiding separately setting a fingerprint identification module and a front camera in the terminal, which reduces a complexity of the internal structure of the terminal and reduces a manufacturing cost of the terminal simultaneously.

In order to improve an imaging quality of the under-screen camera in different application scenarios, the terminal needs to optimize the image acquisition process of the under-screen camera from the software level. The following uses an example embodiment to separately describe the image acquisition process in the fingerprint recognition scene and the front-shooting scene.

Figure 5:
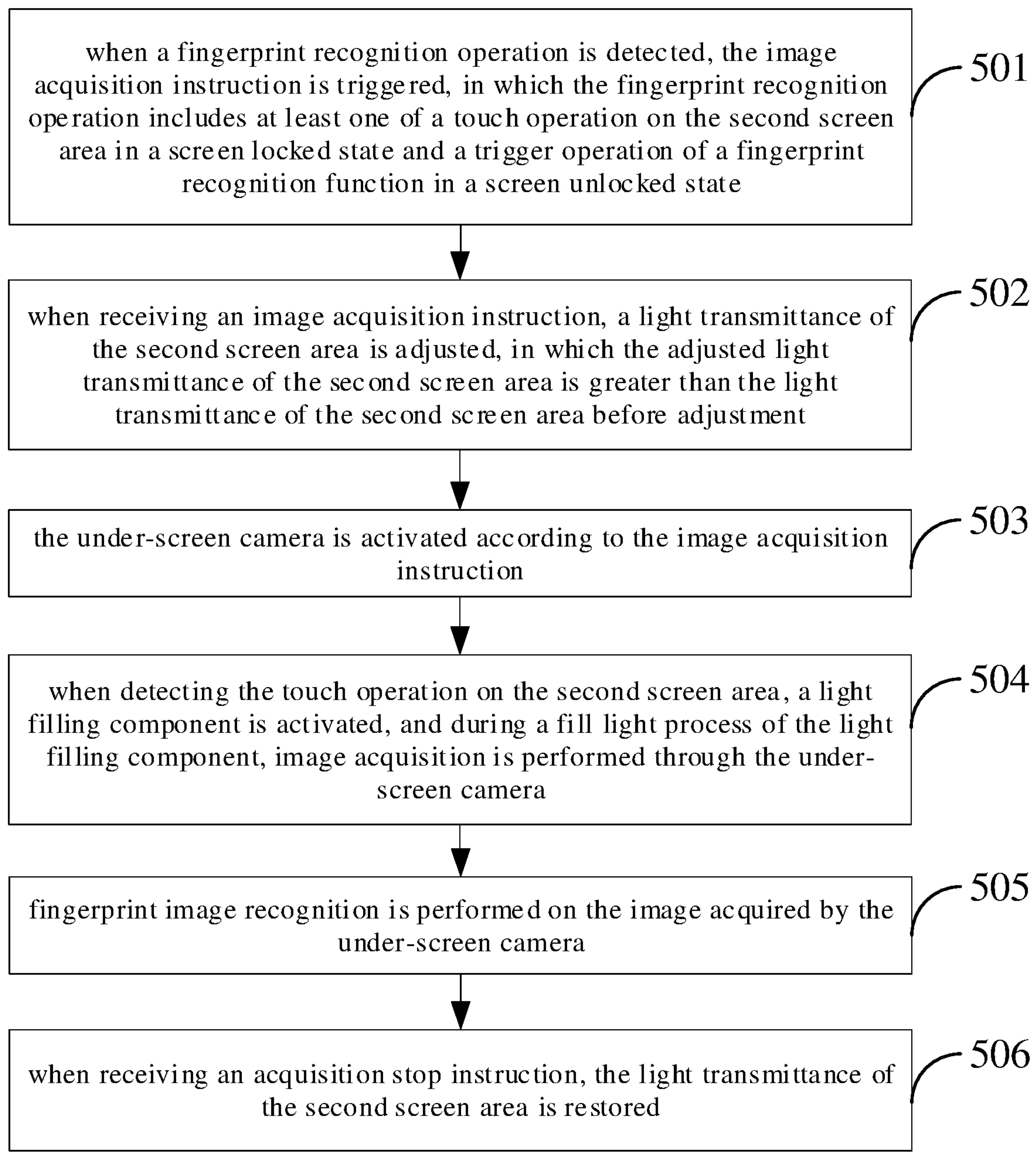
FIG. 5 is a flowchart of an image acquisition method according to another example embodiment of the present disclosure.

FIG. 5 is a flowchart of an image acquisition method according to an example embodiment of the present disclosure. The image acquisition method may be executed by an image acquisition apparatus. The apparatus can be implemented as all or part of the terminal in FIG. 1 or 2 through software, hardware, or a combination of both. In this embodiment, the method is applied to a fingerprint recognition scene as an example for description. The method includes the following acts.

At block 501, when a fingerprint recognition operation is detected, the image acquisition instruction is triggered, in which the fingerprint recognition operation includes at least one of a touch operation on the second screen area in a screen locked state and a trigger operation of a fingerprint recognition function in a screen unlocked state.

When the fingerprint recognition operation is received, it is necessary for the terminal to determine that fingerprint image acquisition needs to be performed through the under-screen camera, thereby triggering the image collection instruction. Regarding the form of fingerprint recognition operation, in a possible implementation, in the screen locked state (including light off locked screen and bright locked screen), the terminal detects the user's touch operation on the display screen, and detects the touch operation on the second display area of the screen, it is determined that the fingerprint recognition operation is detected, thereby triggering the image acquisition instruction.

In another possible implementation, in the unlocked state, when a triggering operation for the fingerprint recognition function is detected, the terminal determines that a fingerprint recognition operation is detected, thereby triggering an image acquisition instruction, where the fingerprint recognition function includes a fingerprint payment function (identifying fingerprint image to complete payment), a fingerprint encryption and decryption function (identifying fingerprint image to complete encryption and decryption), and a fingerprint login function (identifying fingerprint image to complete account or login applications), which is not limited herein.

At block 502, when receiving an image acquisition instruction, a light transmittance of the second screen area is adjusted, in which the adjusted light transmittance of the second screen area is greater than the light transmittance of the second screen area before adjustment.

In a possible implementation, if an image acquisition instruction is received in a bright screen state, since both the first screen area and the second screen area are in the display state, that is, images are displayed on both the first screen area and the second screen area. Therefore, in order to prevent the image displayed in the second screen area from affecting the image acquisition of the under-screen camera, the terminal also needs to switch the state of the second screen area from the display state to the non-display state. Optionally, this act includes the followings.

(1) When the image acquisition instruction is received in a bright screen state, a state of the second screen area is switched from a display state to a non-display state, and in the non-display state, the second screen area does not display images.

In a possible implementation, if the image acquisition instruction is received in the bright screen state, the terminal switches the state of the second screen area from the display state to the non-display state according to pixel coordinates of the pixels corresponding to the second screen area, and displaying images in the second screen area is interrupted. When the second screen area is switched to the non-display state, the first screen area is still in the display state, thereby ensuring the normal display of the entire screen.

(2) In the non-display state, the light transmittance of the second screen area is adjusted.

Further, the terminal adjusts the light transmittance of the second screen area in the non-display mode to improve the quality of the fingerprint image collected by the under-screen camera in the fingerprint recognition scene. For the method of adjusting the light transmittance, reference may be made to the above act at block 401, which is not repeated in this embodiment.

Certainly, in addition to switching the state of the second screen area to the non-display state, the terminal also switches the state of the second screen area to a pure color display state, for example, the second screen area is displayed as pure white, thereby reducing impact on the image acquisition caused by the image displayed on the second screen area, which is not limited in this embodiment.

In other possible implementations, if the image acquisition instruction is received in the light off locked screen, since the first screen area and the second screen area are both in a non-display state at this time, the terminal directly adjusts the light transmittance of the second screen area. For the manner of adjusting the light transmittance, reference may be made to the above act at block 401, which is not repeated in this embodiment.

At block 503, the under-screen camera is activated according to the image acquisition instruction.

The terminal activates the under-screen camera according to the triggered image acquisition instruction. This act may be executed synchronously with the act at block 502, or may be executed successively with the act at block 502, which is not limited in this embodiment.

At block 504, when detecting the touch operation on the second screen area, a light filling component is activated, and during a fill light process of the light filling component, image acquisition is performed through the under-screen camera.

In the fingerprint recognition scenario, the user's finger needs to be in contact with the screen cover above the second screen area so that the under-screen camera below the second screen area can collect fingerprint images. However, the user's fingers located above the second screen area block the external light and affect the amount of light entering the under-screen camera below the second screen area, resulting in poor fingerprint image collection effect, especially when the terminal is in a light off state.

In order to improve the collection quality of fingerprint images in the fingerprint recognition scene, in a possible implementation, light filling components are provided around the under-screen camera, the light filling components are configured for light filling in the fingerprint image acquisition process. Moreover, the light filling component may be an LED lamp, which is not limited in this embodiment. Illustratively, as shown in FIG. 6, the area of the second screen area 132 in the display screen 130 is slightly larger than the size of the under-screen camera 140, and light filling components 150 are provided around the under-screen camera 140.

Optionally, when a touch operation on the second screen area is detected, the terminal activates the light filling components to fill the light on the user's fingers above the second screen area. In the process, fingerprint images are collected through the under-screen camera. The terminal controls light filling process and image acquisition at the same time, so as to ensure the quality of the collected fingerprint images.

Figure 6:
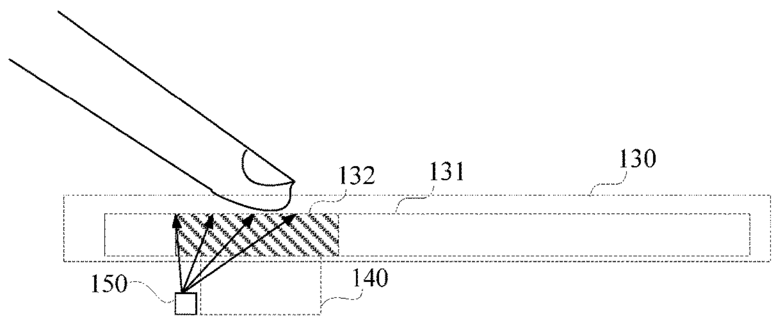
FIG. 6 is a schematic diagram of a light filling process of a light filling component according to an example embodiment of the present disclosure.

As illustrated in FIG. 6, during the light filling process, the light emitted by the light filling components 150 is projected on the user's finger through the second screen area 132, thereby ensuring the amount of light entering the under-screen camera 140 when capturing the image, thereby improving the quality of the fingerprint image.

In other possible implementations, when the display screen is an OLED screen, the terminal may also control the pixels on the second screen area to emit light when receiving a touch operation on the second screen area, so as to achieve the effect of light filling, which is not limited in this embodiment.

At block 505, fingerprint image recognition is performed on the image acquired by the under-screen camera.

Optionally, the terminal performs fingerprint image recognition on the collected fingerprint images, determines whether the fingerprint image matches the fingerprint image template, and determines that the fingerprint image is recognized when the fingerprint image matches the fingerprint image template, so as to perform subsequent operations. The embodiment of the present disclosure does not limit the specific process of fingerprint image recognition.

At block 506, when receiving an acquisition stop instruction, the light transmittance of the second screen area is restored.

After increasing the light transmittance of the second screen area, since the light that can pass through the second screen area increases, the visibility of the under-screen camera below the second screen area is improved accordingly. In order to avoid the impact of high visibility of the under-screen camera on the user's perception when there is no fingerprint recognition requirement, in a possible implementation, when receiving the acquisition stop instruction, the terminal restores the light transmittance of the second screen area (that is, reducing the light transmittance of the second screen area) to reduce the visibility of the under-screen camera.

Optionally, the acquisition stop instruction is an instruction triggered when the fingerprint is recognized, also an instruction triggered when a number of fingerprint recognition failures exceeds a preset number, or an instruction triggered when the fingerprint recognition is cancelled, which is not limited in this embodiment.

In a possible implementation, when the second screen area is made of electrochromic materials, the terminal adjusts the light transmittance of the second screen area by adjusting the voltage of the second screen area. For example, in the normal display state, the first voltage is applied to the second screen area, and the light transmittance of the second screen area is the first light transmittance, and when the image acquisition instruction is received, the voltage applied to the second screen area is adjusted to the second voltage. At this time, the light transmittance of the second screen area is the second light transmittance, and the second light transmittance is greater than the first light transmittance. The voltage applied to the area is restored to the first voltage, thereby restoring the first light transmittance of the second screen area.

Optionally, when receiving the acquisition stop instruction, the terminal turns off the under-screen camera to reduce power consumption of the terminal.

It is noted that, corresponding to the above act at block 502, if the state of the second screen area is switched to a non-display state during the image acquisition process, when receiving the acquisition stop instruction, the terminal restores the state of the second screen area to the display state, thereby displaying images with the first screen area.

In the embodiment, in the bright screen state, the terminal switches the state of the second screen area from the display state to the non-display state, to avoid the impact of the image displayed on the second screen area on the fingerprint image acquisition, and improve the fingerprint image acquisition quality. Moreover, the terminal fills light through the light filling components provided around the under-screen camera, thereby improving the amount of light entering the under-screen camera during fingerprint image acquisition and the quality of fingerprint image acquisition, which is conductive to improve the accuracy of subsequent fingerprint recognition.

According to the relation among an object distance, an image distance, and a focal length during imaging process (1/object distance+1/image distance=1/focal length), it is known that in the case where the focal length is fixed, the object distance is inversely proportional to the image distance. In the fingerprint recognition scenario, the distance between the user's finger and the camera (lens) of the under-screen camera is small. Therefore, in order to improve the quality of fingerprint image acquisition and the speed of fingerprint image acquisition, during the image acquisition process performed with the under-screen camera, the terminal activates the under-screen camera according to the image acquisition instruction, and adjusts the under-screen camera to a microspur shooting mode, so as to perform image acquisition with the under-screen camera in the microspur shooting mode.

In a possible implementation, the terminal stores camera parameters corresponding to different shooting modes (for example, image distance information). When image acquisition is performed with the under-screen camera, the terminal sets the under-screen camera according to the camera parameters in the microspur shooting mode, to adjust the under-screen camera to the microspur shooting mode.

Since the microspur shooting mode is set during an activating process, the under-screen camera can focus more quickly and collect clear fingerprint images when the focusing is completed, thereby improving the collection efficiency and quality of fingerprint images.

Figure 7:
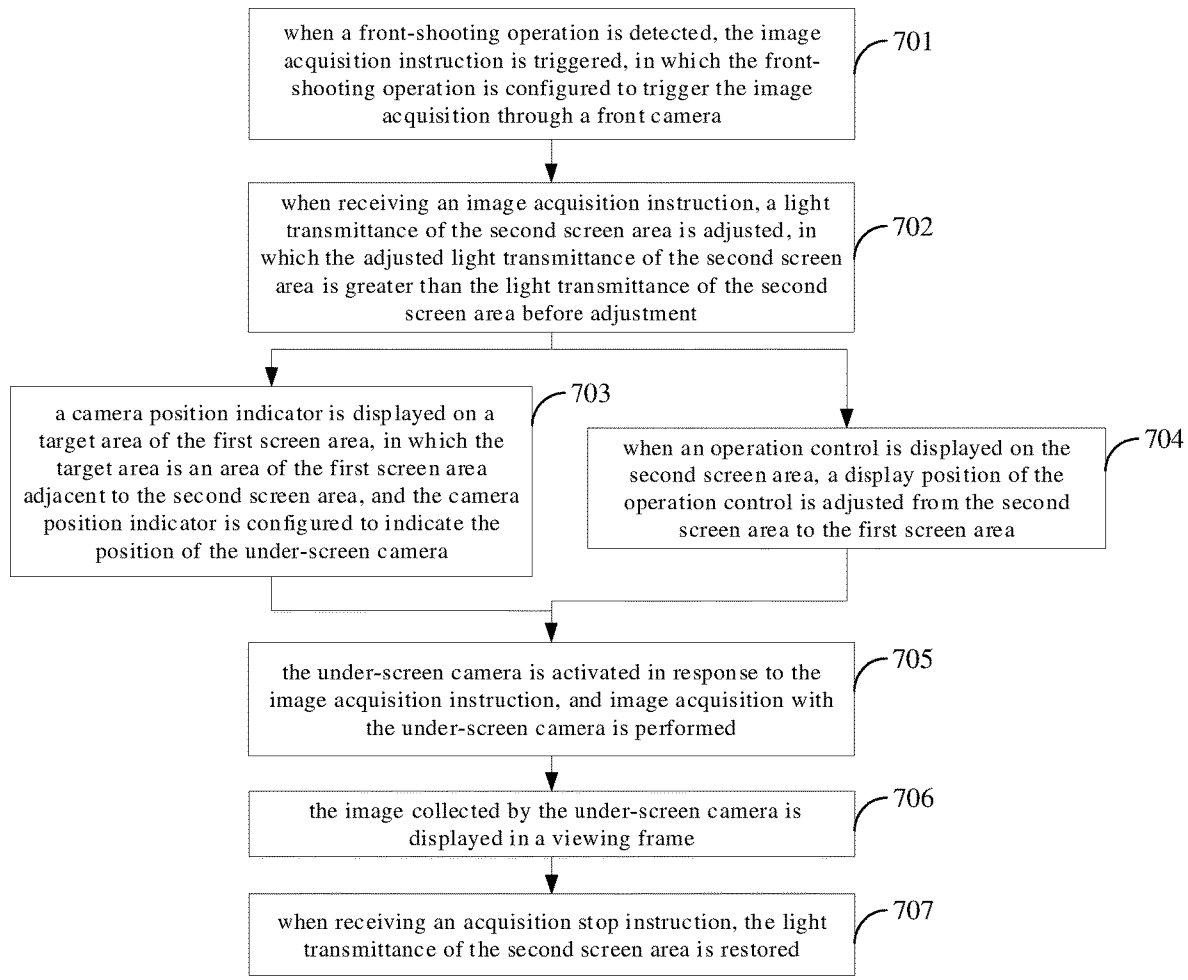
FIG. 7 is a flowchart of an image acquisition method according to another example embodiment of the present disclosure.

FIG. 7 is a flowchart of an image acquisition method according to an example embodiment of the present disclosure. In this embodiment, the method is applied to the front shooting scene as an example for description. The method includes the followings.

At block 701, when a front-shooting operation is detected, the image acquisition instruction is triggered, in which the front-shooting operation is configured to trigger the image acquisition through a front camera.

In the embodiments of the present disclosure, the under-screen camera is configured for fingerprint image acquisition, and is also reused as the front camera of the terminal to collect the front image. Optionally, the front shooting operation includes a selfie function triggering operation, a video call triggering operation, and a face login triggering operation. Any operation that requires image acquisition through the front camera may be considered as the front shooting operation, which is not limited in this embodiment.

In a schematic example, when the user opens a shooting application and selects a selfie function, the terminal receives the front shooting operation. When the user opens an instant communication application and selects a video call function, the terminal receives the front shooting operation. When the user opens a shopping application and selects a face payment function, the terminal receives the front shooting operation.

At block 702, when receiving an image acquisition instruction, a light transmittance of the second screen area is adjusted, in which the adjusted light transmittance of the second screen area is greater than the light transmittance of the second screen area before adjustment.

In the front shooting scene, since the terminal is in the bright screen state, in order to avoid the image displayed on the second screen area from affecting the image acquisition, in a possible implementation, when the image acquisition instruction is received in the bright screen state, the terminal switches the state of the second screen area from the display state to the non-display state, and adjusts the light transmittance of the second screen area in the non-display state. For the process of switching to the non-display state and adjusting the light transmittance, reference may be made to the act at block 502 above, which is not limited herein.

At block 703, a camera position indicator is displayed on a target area of the first screen area, in which the target area is an area of the first screen area adjacent to the second screen area, and the camera position indicator is configured to indicate the position of the under-screen camera.

Normally, the front camera is set on the upper half of the display screen. In the embodiment of the present disclosure, in order to reuse the under-screen camera for fingerprint recognition and front viewing, and to improve the convenience of fingerprint recognition simultaneously, the under-screen camera can be set on the lower half of the display screen. In this setting mode, the user may not be able to accurately know the exact position of the under-screen camera, which leads to the need to continuously adjust the shooting angle during front shooting, which affects the shooting efficiency.

In order to improve the efficiency of front viewing, in a possible implementation, the terminal displays a camera position indicator on a target area on the first screen area, so that the camera position indicator indicates the position of the under-screen camera.

Optionally, the camera position indicator is a ring mark surrounding the second screen area, and the camera position indicator is highlighted by highlighting, flashing, or the like. Certainly, the terminal can also mark the position of the under-screen camera on the first screen area by means of arrows and texts, which is not limited in this embodiment.

Figure 8:
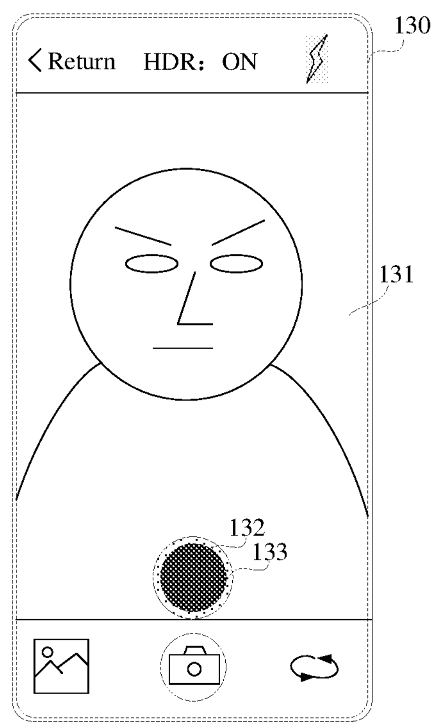
FIG. 8 is a schematic diagram of a camera position identifier according to an example embodiment of the present disclosure.

Schematically, as illustrated in FIG. 8, when taking selfie, the second screen area 132 of the display screen 130 stops displaying images, and a ring camera position indicator 133 (shown on the first screen area 131) is displayed on an annular region around the second screen area 132. The user can quickly locate the position of the under-screen camera through the ring camera position indicator 133, thereby quickly adjusting shooting angle.

At block 704, when an operation control is displayed on the second screen area, a display position of the operation control is adjusted from the second screen area to the first screen area.

During the front shooting process using the under-screen camera, if there is object obstruction above the second screen area, the image acquisition is affected. Therefore, in order to avoid the image acquisition failure due to the operation of the operation control displayed on the second screen area during the shooting process, in a possible implementation, the terminal detects whether the operation control is displayed on the second screen area. If there is an operation control, the display position of the operation control is adjusted from the second screen area to the first screen area.

Optionally, the terminal obtains a control display coordinate of each operation control in the user interface, and detects whether there is an intersection between the control display coordinate of the operation control and the area coordinate of the second screen area, and if there is an intersection, determines that the operation control is located in the second screen area, and adjusts the control display coordinate, so that there is no intersection between the control display coordinate of the operation control after adjustment and the area coordinate of the second screen area.

Optionally, if an operation control is displayed on the second screen area, and the operation control is a target operation control, the terminal adjusts the display position of the operation control to the first screen area. The target operation control includes at least one of a shutter control and a recording control (when the shutter or recording control is clicked, the under-screen camera is blocked and the shooting fails).

Figure 9:
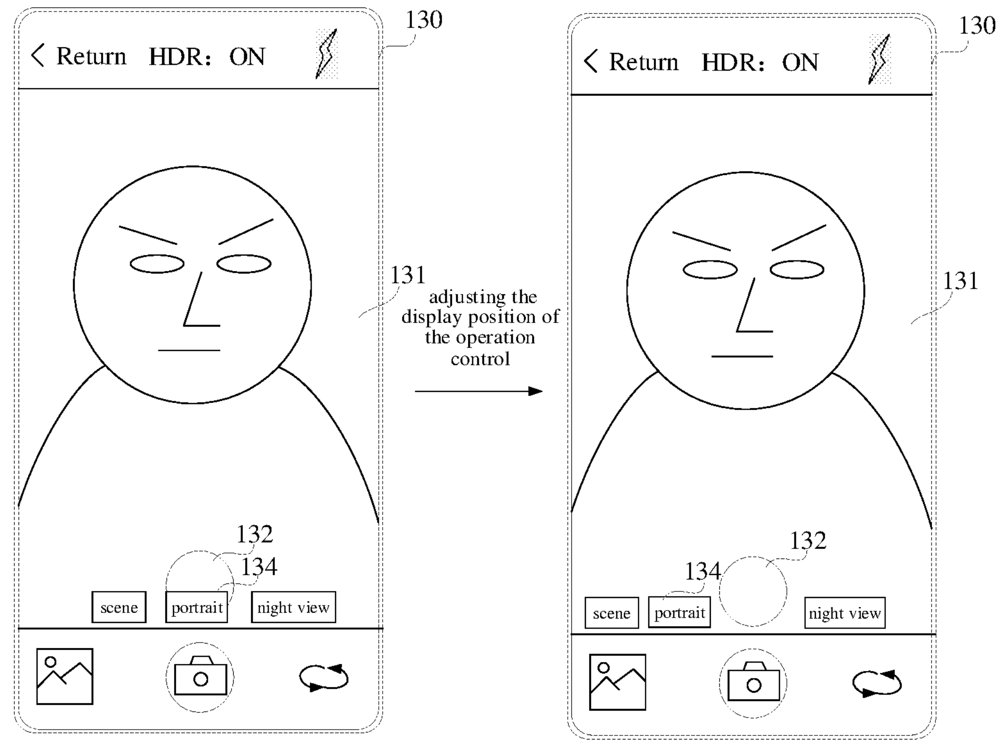
FIG. 9 is a schematic diagram of an interface for adjusting a display position of an operation control.

Schematically, as illustrated in FIG. 9, during taking selfie, the second screen area 132 of the display screen 130 originally displays the operation control 134. In order to avoid blocking the under-screen camera when the operation control 134 is clicked, the terminal adjusts the display position of the operation control 134 to the first screen area 131.

It is noted that there is no strict sequence between acts at blocks 703 and 704, that is, the acts at blocks 703 and 704 can be executed simultaneously, and the terminal can perform either or both of acts at blocks 703 and 704, which is not limited in the embodiment.

At block 705, the under-screen camera is activated in response to the image acquisition instruction, and image acquisition with the under-screen camera is performed.

The terminal activates the under-screen camera in response to the triggered image acquisition instruction. This act may be executed simultaneously with the act at block 702, or may be executed sequentially with the act at block 702. The execution timing of the two acts is not limited in the embodiment.

At block 706, the image collected by the under-screen camera is displayed in a viewing frame.

In a possible implementation, the terminal directly displays the collected front image in the viewing frame.

For convenience of fingerprint recognition, the second screen area is generally located on the lower half of the display screen (to facilitate the user to hold the terminal with one hand for fingerprint recognition). However, in this case, the viewing direction of the under-screen camera is different from that of the traditional front camera (located on the upper half of the display screen).

In order to solve the problem of the difference in the viewing direction, in a possible implementation, when the terminal displays the viewing frame, the image can be rotated, thereby prompting the user to rotate the mobile phone for front viewing, so that the viewing direction of the under-screen camera is the same as the direction of the traditional front camera. Optionally, this act may include the followings.

(1) A terminal posture is obtained, the terminal posture includes a first posture and a second posture, in the first posture, the second screen area is located on a lower half of the display screen, and in the second posture, the second screen area is located on an upper half of the display screen.

Optionally, in the front shooting scene, before displaying the image collected by the under-screen camera, the terminal obtains the current terminal posture. Under different terminal postures, the second screen area is located on a different position on the display screen. In the first posture, the second screen area is located on the lower half of the display screen, and in the second posture, the second screen area is located on the upper half of the display screen.

In a possible implementation, the first posture is the posture of the terminal in a normal holding state, and the second posture is the posture of the terminal after the terminal is rotated by 180 degrees.

In a possible implementation, the terminal may acquire the terminal posture through an acceleration sensor.

(2) When the terminal is in the first posture, the image is rotated and the rotated image is displayed on a viewing frame.

In the first posture, since the viewing direction of the under-screen camera is different from that of the traditional front camera, in order to encourage the user to actively rotate the terminal, the viewing direction of the under-screen camera after rotation is the same as that of the traditional front camera. Optionally, the terminal rotates the image collected by the under-screen camera, so that the rotated image is displayed in the viewing frame.

Figure 10:
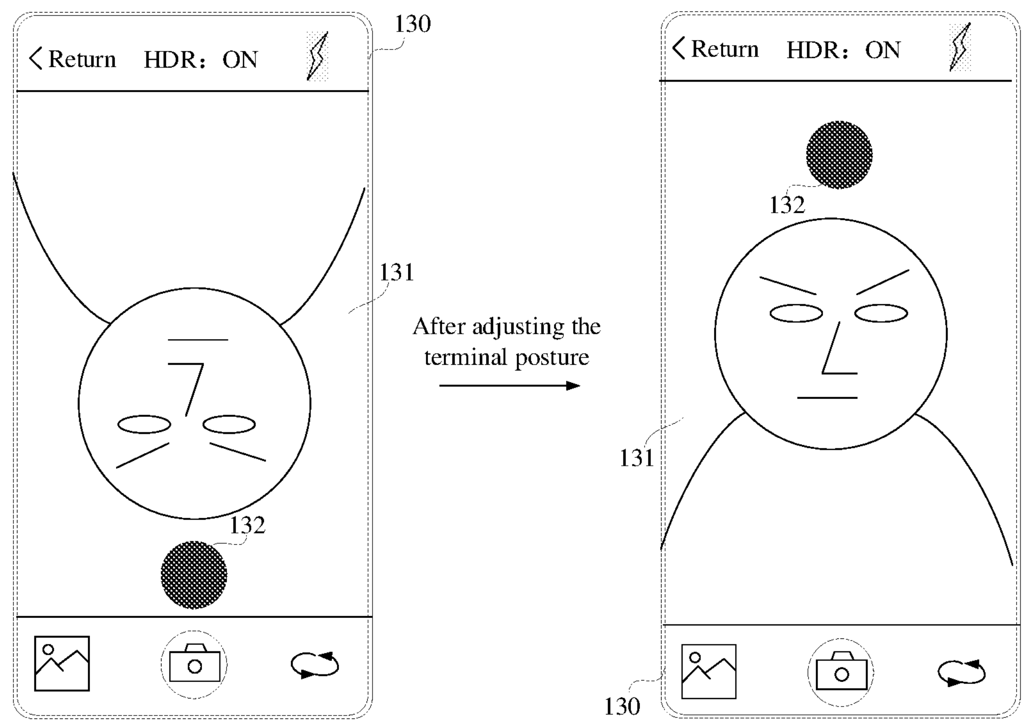
FIG. 10 is a schematic diagram of a viewing interface before and after adjusting a posture of a terminal.

Schematically, as illustrated in FIG. 10, the terminal is currently in the first posture (the second screen area 132 is located on the lower half of the screen 130), the image collected by the under-screen camera is rotated by the terminal by 180 degrees, and the rotated image is displayed on the viewing frame.

(3) When the terminal is in the second posture, the image is displayed on the viewing frame.

After viewing the inverted image displayed in the viewing frame, the user actively rotates the terminal. Correspondingly, when it is detected that the terminal is in the second posture, since the viewing direction of the under-screen camera is the same as the viewing direction of the traditional front camera, the terminal directly displays the image collected by the under-screen camera on the viewing frame.

Optionally, the terminal in the second posture adjusts the layout of the interface elements in the viewing frame to make it consistent with the layout of the interface elements in the first posture.

Schematically, as illustrated in FIG. 10, after the user rotates the terminal by 180 degrees, the second screen area 132 is on the upper half of the display screen 130. The terminal no longer rotates the image collected by the under-screen camera, but directly displays the collected image in the viewing frame.

In the above manner, the user actively rotates the terminal to adjust the viewing direction of the under-screen camera, thereby alleviating the influence of the setting position of the under-screen camera on the front viewing, and ensuring the viewing quality of the front viewing.

In other possible implementation, in the first posture, the terminal may also display a prompt message in the first screen area to prompt the user to rotate the terminal to adjust the viewing direction, which is not limited in the embodiment.

At block 707, when receiving an acquisition stop instruction, the light transmittance of the second screen area is restored.

For the implementation of this act, reference may be made to act at block 506 described above, which is not repeated herein.

In the embodiment, in the front shooting scene, the terminal displays the camera position identifier around the second screen area to facilitate the user to determine the position of the under-screen camera according to the camera position identifier, thereby improving the efficiency of adjusting the viewing angle of the user. In addition, the terminal moves the operation controls displayed on the second screen area to the first screen area to prevent the effect of clicking on the operation control by the user on the viewing of the under-screen camera. Meanwhile, the terminal adjusts the image in the viewing frame according to the current terminal posture, thereby prompting the user to actively rotate the terminal to adjust the viewing direction of the under-screen camera, thereby improving the quality of front shooting.

Figure 11:
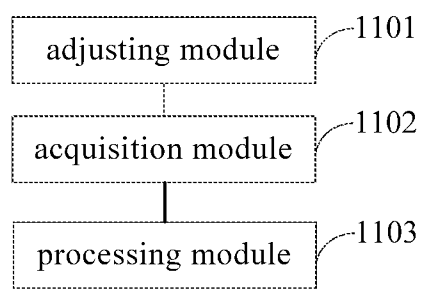
FIG. 11 is a block diagram of an image acquisition apparatus according to an embodiment of the present disclosure.

FIG. 11 is a block diagram of an image acquisition apparatus according to an embodiment of the present disclosure. The apparatus can be implemented as all or part of the terminal in FIG. 1 or 2 through software, hardware, or a combination of both. The apparatus includes an adjusting module 1101, an acquisition module 1102 and a processing module 1103.

The adjusting module 1101 is configured to, when receiving an image acquisition instruction, adjust a light transmittance of the second screen area, in which the adjusted light transmittance of the second screen area is greater than the light transmittance of the second screen area before adjustment.

The acquisition module 1102 is configured to activate the under-screen camera in response to the image acquisition instruction, and perform image acquisition with the under-screen camera.

The processing module 1103 is configured to perform corresponding process on the image acquired by the under-screen camera, in which the corresponding process includes at least one of fingerprint image recognition and viewfinder image display.

Optionally, the apparatus also includes a first receiving module and/or a second receiving module.

The first receiving module is configured to, when a fingerprint recognition operation is detected, trigger the image acquisition instruction, in which the fingerprint recognition operation includes at least one of a touch operation on the second screen area in a screen locked state and a trigger operation of a fingerprint recognition function in a screen unlocked state.

The second receiving module is configured to, when a front-shooting operation is detected, trigger the image acquisition instruction, in which the front-shooting operation is configured to trigger image acquisition through a front camera.

Optionally, when receiving the image acquisition instruction, the adjusting module 1101 includes a switching unit and an adjusting unit.

The switching unit is configured to when the image acquisition instruction is received in a bright screen state, switch a state of the second screen area from a display state to a non-display state, in which, in the non-display state, the second screen area does not display images.

The adjusting unit is configured to adjust the light transmittance of the second screen area in the non-display state.

Optionally, a light filling component is further provided around the under-screen camera.

When the image acquisition instruction is triggered by the fingerprint recognition operation, the acquisition module 1102 includes a first activating unit and a first acquisition module.

The first activating unit is configured to activate the under-screen camera according to the image acquisition instruction.

The first acquisition module is configured to, when detecting the touch operation on the second screen area, activate the light filling component, and during a fill light process of the light filling component, perform image acquisition through the under-screen camera.

Optionally, when the image acquisition instruction is triggered by the fingerprint recognition operation, the acquisition module 1102 includes a second activating unit and a second acquisition unit.

The second activating unit is configured to activate the under-screen camera in response to the image acquisition instruction, and adjust the under-screen camera to a microspur shooting mode.

The second acquisition unit is configured to perform image acquisition with the under-screen camera in the microspur shooting mode.

Optionally, when the image acquisition instruction is triggered by the front-shooting operation, the apparatus further includes a displaying module.

The displaying module is configured to display a camera position indicator on a target area of the first screen area, in which the target area is an area of the first screen area adjacent to the second screen area, and the camera position indicator is configured to indicate the position of the under-screen camera.

Optionally, when the image acquisition instruction is triggered by the front-shooting operation, the apparatus further includes an adjusting module, which is configured to, if an operation control is displayed on the second screen area, adjust the display position of the operation control from the second screen area to the first screen area.

Optionally, when the image acquisition instruction is triggered by the front-shooting operation, the processing module 1103 includes an obtaining unit, a first display unit, and a second display unit.

The obtaining unit is configured to obtain a terminal posture, in which the terminal posture includes a first posture and a second posture, in the first posture, the second screen area is located on a lower half of the display screen, and in the second posture, the second screen area is located on an upper half of the display screen.

The first display unit is configured to, when the terminal is in the first posture, rotate the image and display the rotated image on a viewing frame.

The second display unit is configured to, when the terminal is in the second posture, display the image on the viewing frame.

Optionally, the apparatus further includes a restoring module, which is configured to, when receiving an acquisition stop instruction, restore the light transmittance of the second screen area.

Optionally, the second screen area is made of electrochromic materials. The adjusting module 1101 is configured to adjust the light transmittance of the second screen area by adjusting a voltage of the second screen area.

In conclusion, in the embodiment of the present disclosure, the under-screen camera is provided below the second screen area of the display screen, and when the image acquisition instruction is received, the light transmittance of the second screen area is increased to acquire images with the under-screen camera provided below the second screen area. In the corresponding application scenarios, fingerprint image identification is performed on the collected image or the collected image is displayed as a framing image. The under-screen camera is adopted to realize front shooting and fingerprint identification, thus avoiding separately setting a fingerprint identification module and a front camera in the terminal, which reduces a complexity of the internal structure of the terminal and reduces a manufacturing cost of the terminal simultaneously.

The embodiments of the present disclosure provide a computer-readable storage medium, in which the storage medium stores at least one instruction, and when the at least one instruction is executed by a processor, the image acquisition method according to the above embodiments is implemented.

The embodiments of the present disclosure provide a computer program product, the computer program product stores at least one instruction, and the at least one instruction is loaded and executed by the processor to implement the image acquisition method described in the above embodiments.

It should be understood that each part of the present disclosure may be realized by the hardware, software, firmware or their combination. When implemented in software, these functions can be stored in a computer-readable medium or transmitted as one or more instructions or code on a computer-readable medium. Computer-readable media includes computer storage media and communication media, and communication media includes any medium that facilitates transfer of a computer program from one place to another. The storage medium may be any available medium that can be accessed by a general-purpose or special-purpose computer.

The above are only preferred embodiments of this disclosure and are not intended to limit this application. Any modification, equivalent replacement, and improvement made within the spirit and principle of this disclosure should be included in the protection range of this disclosure.

What is claimed is:

1. A method for image acquisition for a terminal having a display screen comprising a first screen area and a second screen area, wherein an under-screen camera is disposed under the second screen area, the method comprising:

when receiving an image acquisition instruction, adjusting a light transmittance of the second screen area, wherein the adjusted light transmittance of the second screen area is greater than the light transmittance of the second screen area before adjustment;

activating the under-screen camera in response to the image acquisition instruction, and performing image acquisition with the under-screen camera;

performing corresponding process on the image acquired by the under-screen camera, wherein the corresponding process comprises at least one of fingerprint image recognition or viewfinder image display; and after performing the corresponding process on the image acquired by the under-screen camera, restoring the light transmittance of the second screen area when receiving an acquisition stop instruction.

2. The method according to claim 1, wherein when receiving the image acquisition instruction, the method comprises at least one act of:

before adjusting the light transmittance of the second screen area:

when a fingerprint recognition operation is detected, triggering the image acquisition instruction, wherein the fingerprint recognition operation comprises at least one of a touch operation on the second screen area in a screen locked state or a trigger operation of a fingerprint recognition function in a screen unlocked state;

or, when a front-shooting operation is detected, triggering the image acquisition instruction, wherein the front-shooting operation is configured to trigger the image acquisition through a front camera.

3. The method according to claim 2, wherein adjusting the light transmittance of the second screen area when receiving the image acquisition instruction comprises:

when the image acquisition instruction is received in a bright screen state, switching a state of the second screen area from a display state to a non-display state, wherein, in the non-display state, the second screen area does not display images; and adjusting the light transmittance of the second screen area in the non-display state.

4. The method according to claim 2, wherein a light filling component is further provided around the under-screen camera; and when the image acquisition instruction is triggered by the fingerprint recognition operation, activating the under-screen camera in response to the image acquisition instruction and performing image acquisition with the under-screen camera comprises:

activating the under-screen camera in response to the image acquisition instruction; and when detecting the touch operation on the second screen area, activating the light filling component, and during a light filling process of the light filling component, performing the image acquisition with the under-screen camera.

5. The method according to claim 2, wherein when the image acquisition instruction is triggered by the fingerprint recognition operation, activating the under-screen camera in response to the image acquisition instruction, and performing image acquisition with the under-screen camera comprises:

activating the under-screen camera in response to the image acquisition instruction, and controlling the under-screen camera to enter into a microspur shooting mode; and performing image acquisition with the under-screen camera in the microspur shooting mode.

6. The method according to claim 2, wherein when the image acquisition instruction is triggered by the front-shooting operation, the method further comprises:

after adjusting the light transmittance of the second screen area, displaying a camera position indicator on a target area of the first screen area, wherein the target area is an area of the first screen area adjacent to the second screen area, and the camera position indicator is configured to indicate the position of the under-screen camera.

7. The method according to claim 2, wherein when the image acquisition instruction is triggered by the front-shooting operation, the method further comprises:

after adjusting the light transmittance of the second screen area, when an operation control is displayed on the second screen area, adjusting a display position of the operation control from the second screen area to the first screen area.

8. The method according to claim 2, wherein when the image acquisition instruction is triggered by the front-shooting operation, performing corresponding process on the image acquired by the under-screen camera comprises:

obtaining a terminal posture, wherein the terminal posture comprises a first posture and a second posture, wherein the second screen area is located on a lower half of the display screen in the first posture, and the second screen area is located on an upper half of the display screen in the second posture;

when the terminal is in the first posture, rotating the image, and displaying the rotated image on a viewing frame; and when the terminal is in the second posture, displaying the image on the viewing frame.

9. The method according to claim 1, wherein the second screen area is made of electrochromic materials; and adjusting the light transmittance of the second screen area comprises:

adjusting the light transmittance of the second screen area by adjusting a voltage of the second screen area.

10. An apparatus for image acquisition, applicable for a terminal having a display screen comprising a first screen area and a second screen area, wherein an under-screen camera is disposed under the second screen area, the apparatus comprising:

a memory; and one or more processors configured to execute instructions stored on the memory to:

when receiving an image acquisition instruction, adjust a light transmittance of the second screen area, wherein the adjusted light transmittance of the second screen area is greater than the light transmittance of the second screen area before adjustment;

activate the under-screen camera in response to the image acquisition instruction, and perform image acquisition with the under-screen camera;

perform corresponding process on the image acquired by the under-screen camera, wherein the corresponding process comprises at least one of fingerprint image recognition or viewfinder image display; and when receiving an acquisition stop instruction, restore the light transmittance of the second screen area.

11. The apparatus according to claim 10, wherein the one or more processors are further configured to perform at least one act of:

when a fingerprint recognition operation is detected, triggering the image acquisition instruction, wherein the fingerprint recognition operation comprises at least one of a touch operation on the second screen area in a screen locked state and a trigger operation of a fingerprint recognition function in a screen unlocked state;

or, when a front-shooting operation is detected, triggering the image acquisition instruction, wherein the front-shooting operation is configured to trigger image acquisition through a front camera.

12. The apparatus according to claim 11, wherein when receiving the image acquisition instruction, the one or more processors are further configured to:

when the image acquisition instruction is received in a bright screen state, switch a state of the second screen area from a display state to a non-display state, wherein, in the non-display state, the second screen area does not display images; and adjust the light transmittance of the second screen area in the non-display state.

13. The apparatus according to claim 11, wherein a light filling component is further provided around the under-screen camera; and when the image acquisition instruction is triggered by the fingerprint recognition operation, the one or more processors are further configured to:

activate the under-screen camera according to the image acquisition instruction; and when detecting the touch operation on the second screen area, activate the light filling component, and during a fill light process of the light filling component, perform image acquisition through the under-screen camera.

14. The apparatus according to claim 11, when the image acquisition instruction is triggered by the fingerprint recognition operation, the one or more processors are further configured to:

activate the under-screen camera in response to the image acquisition instruction, and adjust the under-screen camera to a microspur shooting mode; and perform image acquisition with the under-screen camera in the microspur shooting mode.

15. The apparatus according to claim 11, wherein when the image acquisition instruction is triggered by the front-shooting operation, the one or more processors are further configured to:

display a camera position indicator on a target area of the first screen area, wherein the target area is an area of the first screen area adjacent to the second screen area, and the camera position indicator is configured to indicate the position of the under-screen camera.

16. The apparatus according to claim 11, wherein when the image acquisition instruction is triggered by the front-shooting operation, the one or more processors are further configured to:

when an operation control is displayed on the second screen area, adjust the display position of the operation control from the second screen area to the first screen area.

17. The apparatus according to claim 11, wherein when the image acquisition instruction is triggered by the front-shooting operation, the one or more processors are further configured to:

obtain a terminal posture, wherein the terminal posture comprises a first posture and a second posture, in the first posture, the second screen area is located on a lower half of the display screen, and in the second posture, the second screen area is located on an upper half of the display screen;

when the terminal is in the first posture, rotate the image and display the rotated image on a viewing frame; and when the terminal is in the second posture, display the image on the viewing frame.

18. A non-transitory computer-readable storage medium storing at least one instruction, which when executed by a processor, causes the processor to:

when receiving an image acquisition instruction, adjust a light transmittance of a second screen area, wherein the adjusted light transmittance of the second screen area is greater than the light transmittance of the second screen area before adjustment;

activate an under-screen camera in response to the image acquisition instruction, and perform image acquisition with the under-screen camera;

perform corresponding process on the image acquired by the under-screen camera, wherein the corresponding process comprises at least one of fingerprint image recognition or viewfinder image display; and when receiving an acquisition stop instruction, restore the light transmittance of the second screen area.

* * * * *